June 12, 1934. F. E. PFEIFFER Re. 19,208

AUTOGRAPHIC REGISTER

Original Filed Dec. 23, 1929 6 Sheets-Sheet 1

INVENTORS
FRANK E. PFEIFFER.
BY Toulmin & Toulmin
ATTORNEYS

June 12, 1934. F. E. PFEIFFER Re. 19,208

AUTOGRAPHIC REGISTER

Original Filed Dec. 23, 1929 6 Sheets-Sheet 2

INVENTORS
FRANK E. PFEIFFER,
BY
Taulmin & Taulmin
ATTORNEYS

June 12, 1934. F. E. PFEIFFER Re. 19,208

AUTOGRAPHIC REGISTER

Original Filed Dec. 23, 1929 6 Sheets-Sheet 3

INVENTOR
FRANK E. PFEIFFER.
BY
ATTORNEYS

June 12, 1934. F. E. PFEIFFER Re. 19,208

AUTOGRAPHIC REGISTER

Original Filed Dec. 23, 1929 6 Sheets-Sheet 4

INVENTORS
FRANK E. PFEIFFER,
BY
ATTORNEYS

June 12, 1934. F. E. PFEIFFER Re. 19,208
AUTOGRAPHIC REGISTER
Original Filed Dec. 23, 1929 6 Sheets-Sheet 5
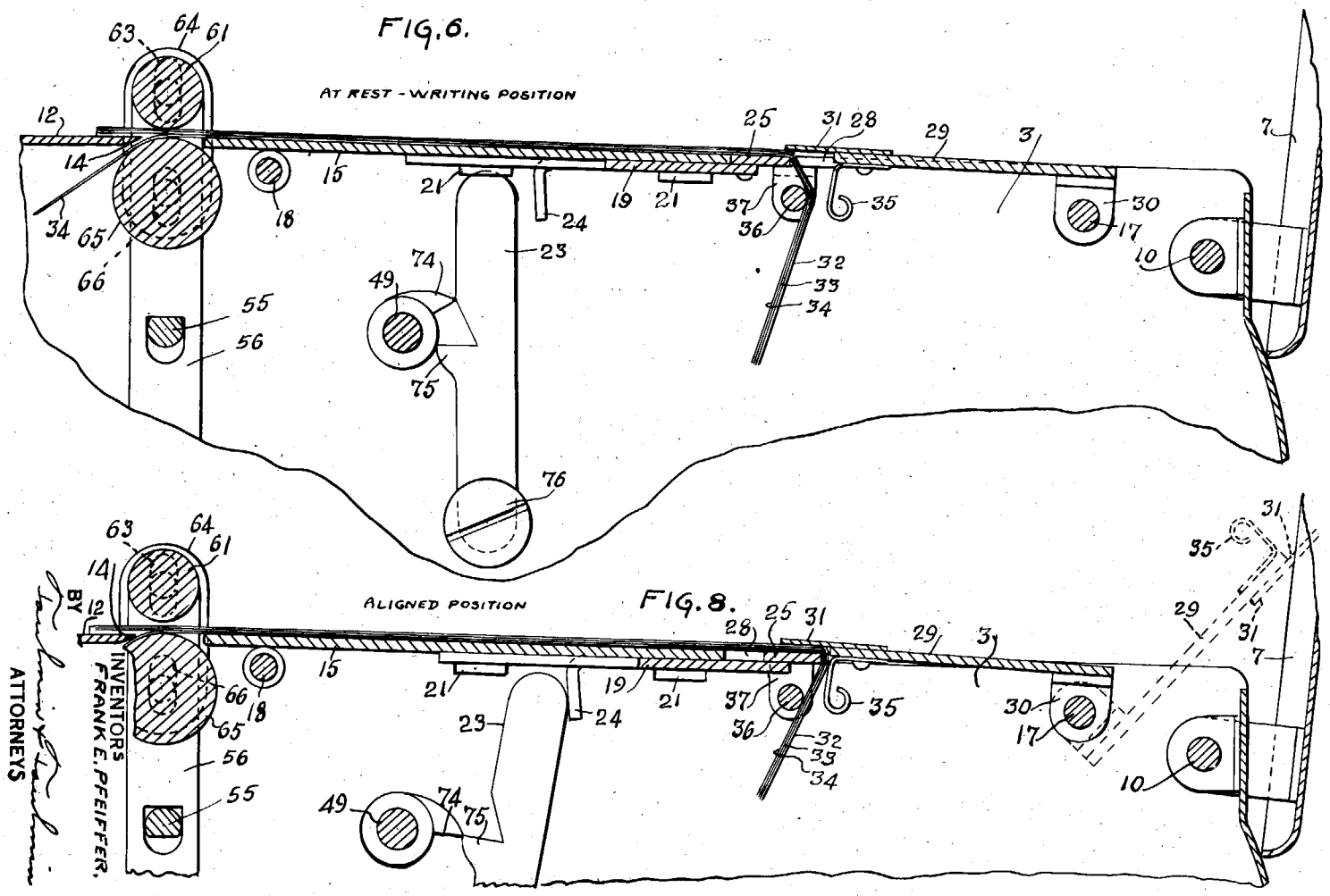
INVENTORS
FRANK E. PFEIFFER,
BY
Faulmann & Faulmann
ATTORNEYS June 12, 1934. F. E. PFEIFFER Re. 19,208
AUTOGRAPHIC REGISTER
Original Filed Dec. 23, 1929 6 Sheets-Sheet 6
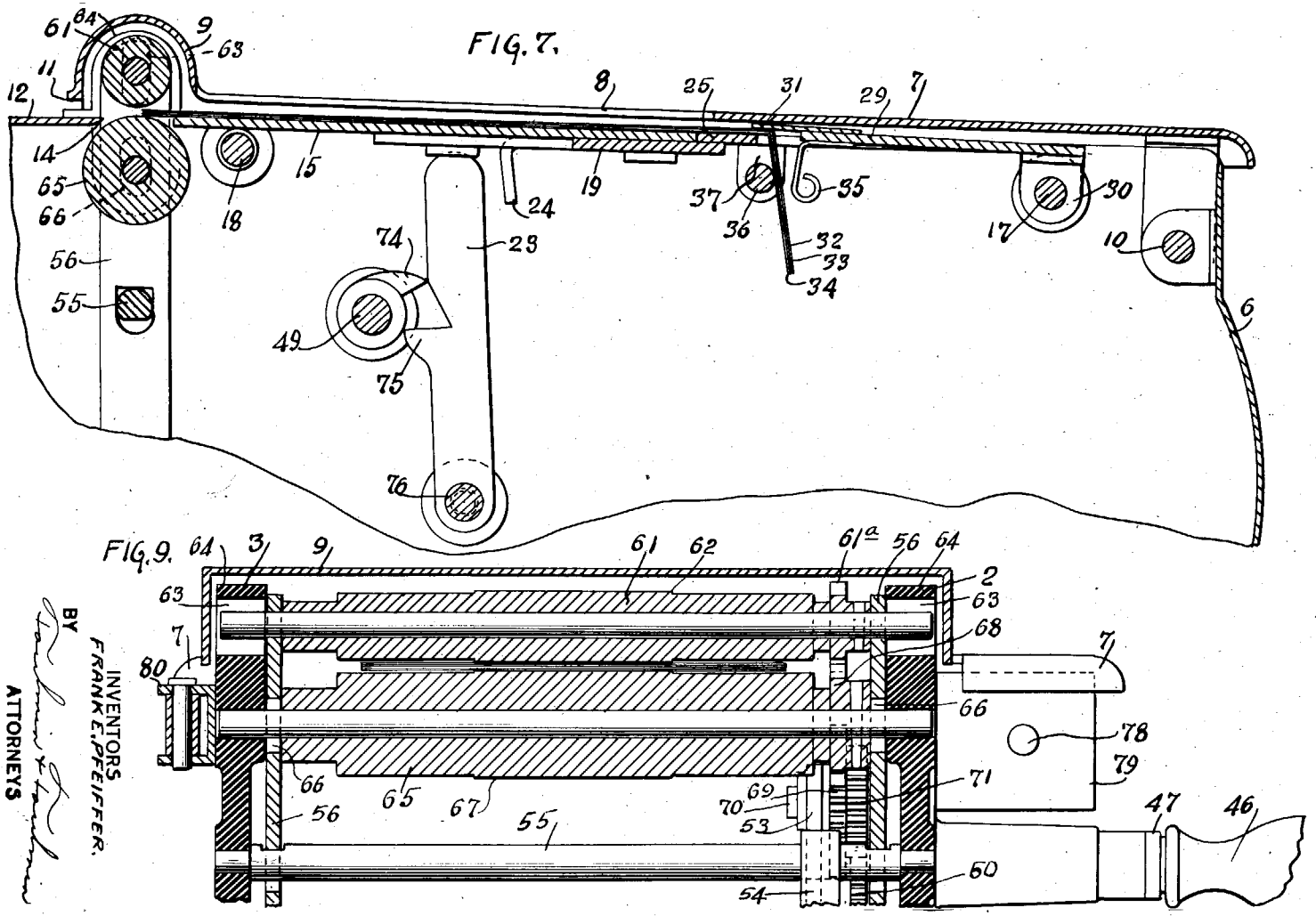
INVENTORS
FRANK E. PFEIFFER.
BY
Faulmann & Faulmann
ATTORNEYS Reissued June 12, 1934

Re. 19,208

UNITED STATES PATENT OFFICE 19,208

AUTOGRAPHIC REGISTER

Frank E. Pfeiffer, Dayton, Ohio, assignor to The Egry Register Company, Dayton, Ohio, a corporation of Ohio Original No. 1,818,271, dated August 11, 1931, Serial No. 416,037, December 23, 1929. Application for reissue January 4, 1933, Serial No. 650,155

15 Claims. (Cl. 282—16)

My invention relates to autographic registers.

It is the object of my invention to align a plurality of paper sheets by engaging said sheets transversely without penetrating the sheets and without the use of perforations in the sheets, through which parts of the machine will penetrate.

It is a further object of my invention to provide an aligning mechanism and an ejecting mechanism driven from a common source of power so arranged as to bring the several superimposed sheets to approximate writing position, cease the ejecting movement, release the sheets from the ejecting means, draw them backwardly to alignment along the transverse creases or minor perforations, re-engage the sheets with the ejecting mechanism, and draw the sheets in aligned condition to final writing position where they are held in clamped condition at the front by the ejecting means and at the rear by the aligning means; and thereby ejecting the previous tickets of the sheet so that they can be torn off or stored, or both.

In particular, it is the object of my invention to utilize a supporting writing table, a shiftable section thereof which supports the sheets as an aligner and an overlapping cover forming a part thereof and forming an aligning abutment.

It is a further object to provide a writing table comprising a writing portion, a reciprocating portion and a cover and abutment section which is tiltably mounted for independent movement of the writing table to permit the paper sheets to be threaded between the abutment and the reciprocating portion of the writing table.

It is a further object to provide a machine in which the substitution of a cam or its positioning will determine the moment of alignment and thereby be adapted to sheets having different lengths of tickets and different spacing between aligning creases, ridges or minor perforations.

It is a further object to provide a machine in which the sheets may be inserted in a pre-folded form, the folding creases, ridges or minor perforations of which can be utilized as an assisting element in effecting the alignment of the sheets.

It is a further object to provide spaced means for controlling the paper on the writing table or platen and to resist its movement when being written upon.

It is a further object to provide means near one end of the writing table to advance the paper and means near the other end to align the paper and resist its forward movement.

It is a further object of the invention to have movable means near the rear of the writing table to cooperate with an adjacent stationary part of the machine in aligning the paper.

It is another object to have a member to engage creased paper along the line of the crease to resist its forward movement.

It is a further object to provide a storage compartment and means of delivering the record sheet thereto, which will re-fold itself in the same condition that it was folded in the initial supply.

Referring to the drawings:

Figure 6 is a section on the line 6—6 of Figure 1 showing diagrammatically the position of the aligning mechanism and the sheets as well as the table when the sheets are at rest in writing position, their forward ends being clamped by the ejecting rolls and their rear ends being engaged in semi-clamped position by the overlapping tilting portion of the writing table;

Figure 7 is a similar view showing the rollers open, ejection having ceased and the preliminary major movement of the sheets forwardly having been accomplished with the sheets in position to be engaged for alignment along the transverse perforations or creases but before the alignment has taken place;

Figure 8 is a similar view showing the sheets with the rolls in position open and the alignment having been accomplished, the sheets having been drawn back in aligning position just prior to their final forward movement in aligned condition where they are brought into writing position as in Figure 6;

Figure 9 is a section on the line 9—9 of Figure 1.

Figure 1:
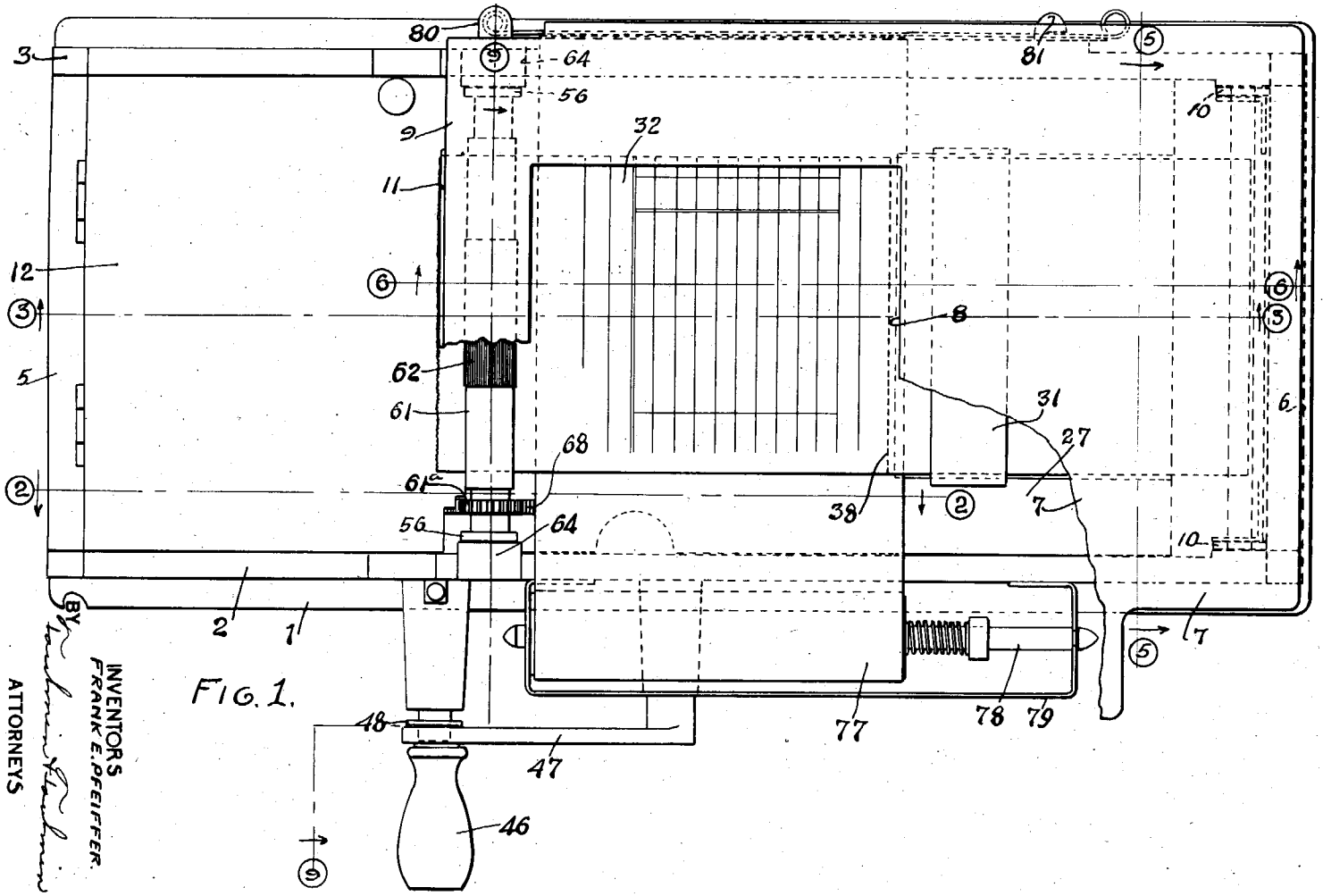
Figure 1 is a top plan view of the register with the cover partially broken away to disclose the transversely arranged carbon sheets and the supply roll therefor, the upper ejecting roller, the writing table, the superimposed writing sheets and the tiltable cover for the sheets as they pass on to the writing table.
Figure 2:
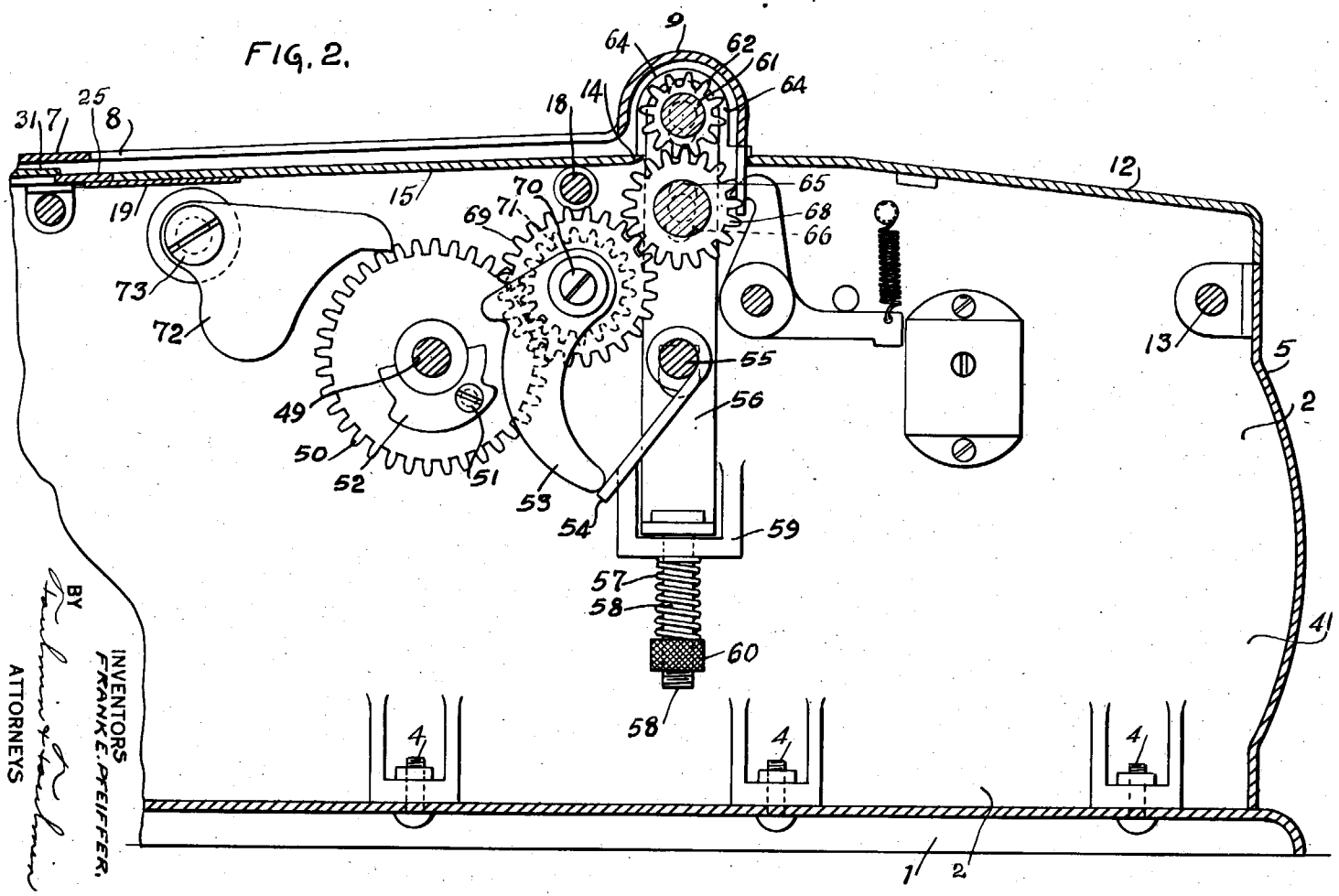
Figure 2 is a section on the line 2—2 of Figure 1 showing the arrangement of the gearing, cams, etc., which are utilized from the common source of power for actuating the ejecting rollers and the aligning mechanism.
Figures 3, 4:
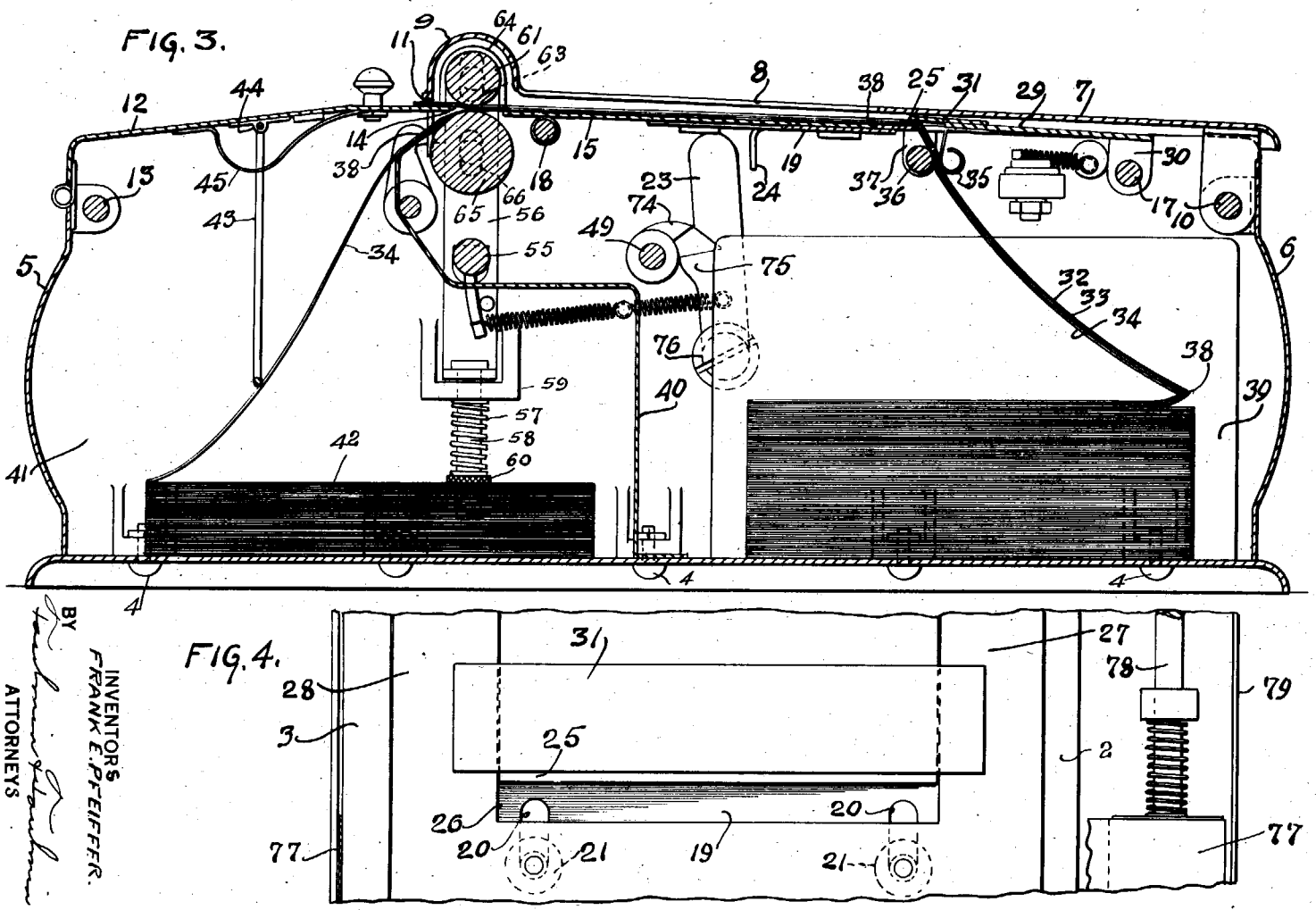
Figure 3 is a section on the line 3—3 of Figure 1 showing the loaded machine with the sheets in position for writing, the lower sheet being stored in the forward storage compartment.
Figure 4 is a top plan view showing the writing table with the shiftable aligning plate in its rearmost position of alignment, the sheets being left off in order to clearly show the position of the mechanism.
Figure 5:
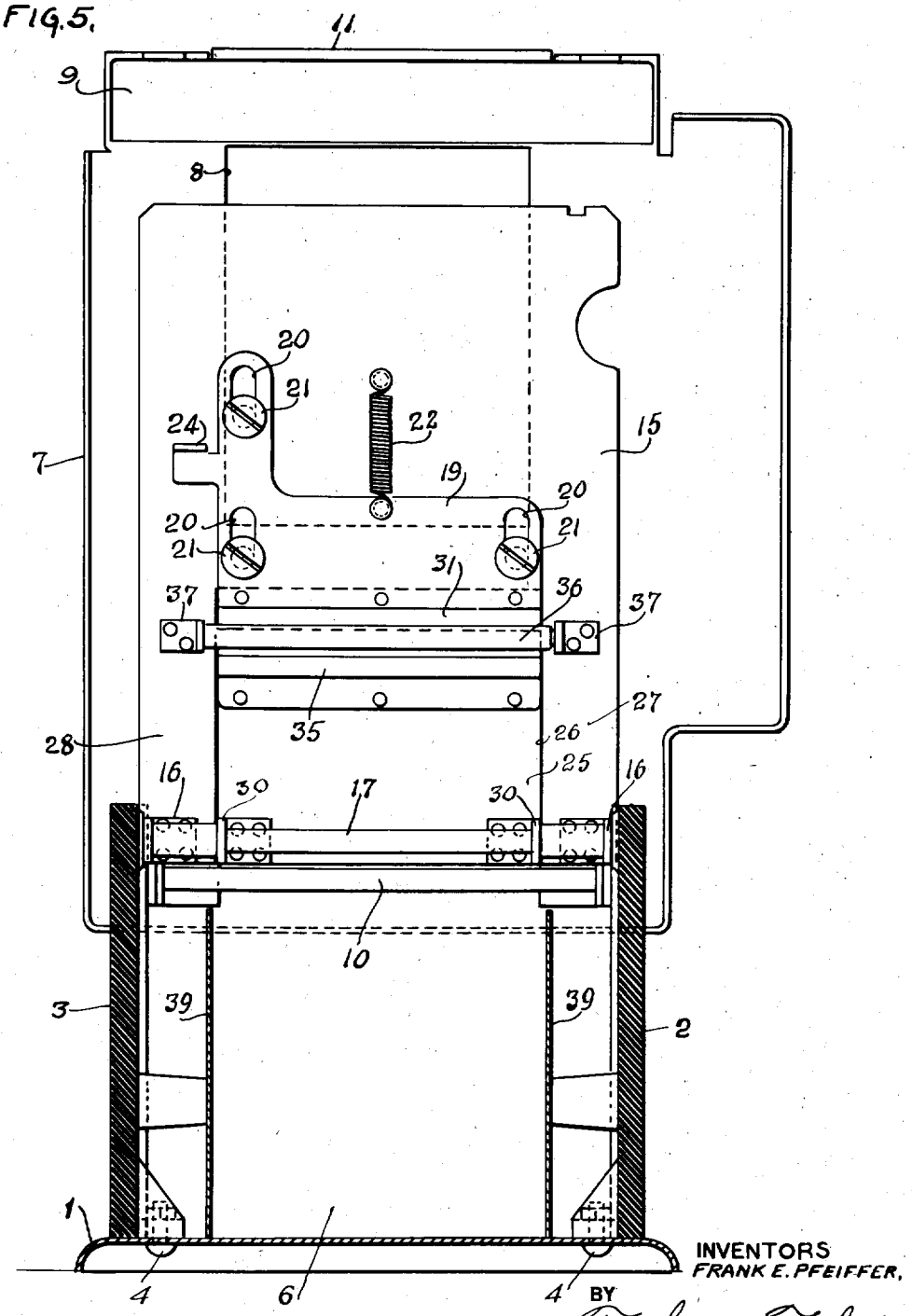
Figure 5 is a section on the line 5—5 of Figure 1 showing the cabinet in section with the cover and writing table elevated looking rearwardly so as to disclose the arrangement of the aligning mechanism as carried beneath the writing table.

Referring to the drawings in detail, 1 is the bottom of the register casing which is provided with side walls 2 and 3. These side walls are attached by bolts 4 to the bottom 1. A forward end wall 5 is attached to the side walls and a rear wall 6 is likewise attached to the side walls thus forming a complete enclosure. A top 7 with a writing opening 8 and a struck up roller enclosure 9 is pivoted at 10. This top has the usual cut off edge 11 at its forward edge against which the tickets, comprising the paper strips, are torn off. A hinged storage compartment lid 12 is hinged at 13 to the front wall 5.

The forward edge 14 of this hinged cover 12 serves to separate the record sheet from the ejected tickets which pass above the cover 12 and are torn off along the edge 11 in the usual manner.

A writing table or platen 15 is provided which is hinged on the arms 16 upon the shaft 17 which is carried by the side walls 2 and 3. The forward end of this writing table is supported by the cross bar 18 carried by the side walls. The writing table carries certain aligning mechanism hereinafter described, although it may be otherwise carried.

*Aligning mechanism*

The aligning mechanism preferably comprises a reciprocating under plate 19 which is slidably carried on the bottom of the writting table 15 by means of slots 20 in the sliding plate 19 and studs in such slots designated 21, which are carried by the writing table 15. The reciprocating under plate 19 is connected to the helical spring 22 which is also connected to the writing table and is thus drawn forwardly into inoperative position normally until actuated by the engagement of the actuating lever 23 with the depending finger 24 which is formed on the plate 19.

The actual alignment is carried out by the rearwardly projected plate 25 which is located within the opening 26 in the writing table 15 between the arms 27 and 28 of the writing table which form its rearward extensions and act as the carriers of its pivotal supports. This plate 25 overlaps the under plate 19 and is fastened to it. The plate 25 is on a level with the writing table 15 and when in its position at rest forms a continuous surface therewith.

The tilting section of the writing table designated 29 is carried on the arms 30 which are pivotally mounted on the cross shaft 17. This plate carries an overlapping plate 31 that overlaps the plate 25 but is customarily spaced therefrom by a plurality of paper sheets 32, 33 and 34 which pass therebetween. The tilting plate 29 also carries a depending curled guiding member 35 which serves to hold the sheets 32, 33 and 34 against the guiding bar 36 which is carried on ears 37 depending from the writing table 15.

*Arrangement of the paper sheets*

These sheets 32, 33 and 34 are customarily scored, bent or perforated with the fine minor perforations at stated intervals as along the line indicated by the numeral 38. They are stacked in a pack within the storage chamber 39 in the rear part of the register. They pass upwardly between the guiding members 35 and 36, through the space between the end of the tilting plate 29 and the reciprocating plate 25 and thence over the writing table 15 forwardly to a point where the record strip 34 passes beneath the end 14 of the record box cover 12 while the other two sheets 32 and 33 pass over the plate 12 where they are torn off as tickets substantially along the line 38 against the tearing edge 11. The supply compartment 39 is separated by a spacing guide strip 40 from the record compartment 41 where the record strip 34 is automatically refolded into the stack and record tickets as at 42. The depending wire belt 43 that is pivotally mounted at 44 in cooperation with the arcuate guide plate 45 serves to guide the strip 34 over the partition plate 40 into its folded record position.

*Actuating mechanism*

The actuating mechanism comprises a handle 46 on a lever 47 which intermittently engages the spring-pressed stop 48 to limit its movement after a complete cycle of operations. The lever 47 is mounted upon the main actuating shaft 49 which carries a master driving gear 50 on which in turn is mounted by the screw 51 a cam 52. This is the spreading cam that engages with the cam lever 53 and thereby moves the spreading lever 54 that is mounted on the cam shaft 55 to rotate it in order to actuate the plates 56 mounted thereon, which plates are resiliently held down by the springs 57 on the bolts 58 which are carried by the plates 56. These springs 57 engage the abutment 59 carried on the inside of the side walls 2 and 3. The tension of the spring or its compression is adjusted by the nut 60 on the bolt 58. The upper end of the plates 56 carry the ends of the shaft that supports the upper roller 61. This roller is knurled as at 62 in the center. The upper roller carries the pinion 61*a*. The ends of the upper roller 61 project into slots 63 in the upstanding ears 64 on either side of the upper edges of the side walls 2 and 3.

The lower roller 65 has its ends projected through slots 66 in the plates 56 to permit the plates to move freely with respect to the lower roller to thus elevate the upper roller. The lower roller is likewise knurled as at 67 to cooperate with the upper knurl of the upper roller as at 62. A gear 68 is mounted on the lower roller for the purpose of driving the gear 62 and the upper roller. The gear 68 in turn is driven by the gear 69 that is carried on the stub shaft 70 which is connected to the gear 71 that meshes with the master driving gear 50. These gears are prevented from turning backwardly by the pawl 72 which is pivoted on the side wall 2 at 73. Thus, the cam 52 at a predetermined regular interval in each cycle of operations will render the ejecting rollers inoperative to eject paper by spreading them.

*Aligning-actuating mechanism*

The shaft 49 performs the further function of actuating the aligning mechanism at a time when the rolls are spread and, therefore, inoperative by carrying the cam 74 which engages with the cam 75 on the lever 23 that is pivoted at 76. The upper end of this lever engages, as heretofore described, with the depending fingers 24 of the under plate 19, thus moving it backwardly to align the sheets along the fold, score or minor perforations 38. It is enabled to do so by reason of the fact that, at the time this backward movement for alignment takes place, the several sheets are in loose condition having been freed from the supporting rollers by the movements heretofore described.

The carbon sheets which are transversely disposed between the paper sheets 32, 33 and 34 are mounted upon a roll 77 on a spindle 78 detachably mounted in the carbon box 79. These sheets are held by the usual clamp on the other side of the machine pivoted at 80 and having a latch 81. As this particular detail method of handling the carbon has no part in my invention, it is unnecessary to describe it in considerable detail.

*Method of operation*

In practice, upon the actuation of the handle 46 and lever 47 or by any other suitable means, the master actuating shaft 49 is caused to rotate through its cycle. This results in the following:

(*a*) The rotation of the upper and lower rolls 61 and 65 which thereby draw the sheets 32, 33 and 34 between the guides 35 and 36 over the writing table 15 a major portion of the length of such sheets and this ejecting operation continues until a small fraction of the sheets remains beneath the overlapping plate 31 with the crease 38 adjacent the abutting forward end of the tilting plate 29 and adapted to be moved backwardly against that abutment by the reciprocating plate 25.

(*b*) At this point the rolls are spread, the sheets cease to move forwardly and the aligning plate 25 is moved backwardly against the crease, score or minor perforations 38 until the sheets are aligned on the line 38 between the rearwardly disposed plate 25 and the abutting forward edge of the plate 29 into which relationship they are guided by the overlapping plate 31. The sheets are thus aligned while they are in loose condition.

(*c*) Upon the accomplishment of this movement, the aligning plate 25 is released and is snapped forwardly by the spring 22 to its initial position. Substantially simultaneously, the rolls re-grip the paper sheets and move them forwardly a distance sufficient to bring the under side of the sheets along the line 38 against the rear edge of the reciprocating plate 25 when in its forward position whereupon the cycle of operation is completed. Thus, the sheets are held in writing position at the forward end between the clamping ejecting rolls and at the rear end by the overlapping plate 25 which maintains them in neat aligned condition. The plate 25 resists forward movement of the paper sheets while in engagement with the crease, score or minor perforations, which weaken the sheets at such points.

Thus, the sheets are first moved a major portion of the distance in approximately unaligned condition, then they are released and aligned by drawing them backwardly into alignment along the crease 38; and then they are moved forwardly in aligned condition a short distance until they are in writing position and are substantially clamped and held in that position during the writing operation.

When these sheets are again actuated after having been written upon, one of them, sheet 34, goes into record storage and the other two pass out until the next creased line or perforation line 38 is approximately under the cutting edge 11 whereupon these tickets comprising the free ends of the sheets 32 and 33 are torn off for proper distribution in the usual manner.

It will be understood that I desire to comprehend within my invention such modifications as may be necessary to adapt it to varying conditions and uses.

Having thus fully described my invention, what I claim as new and desire to secure by Letters Patent, is:

1. In an autographic register having a plurality of superimposed sheets passing over a writing table, a writing table comprised of a stationary portion and a reciprocating portion, and means to move the reciprocating portion against the sheets passing thereover to align them on a predetermined line.

2. In an autographic register having a plurality of sheets with transverse spaced creases defining tickets in the sheets, a writing table over which said sheets pass, means to move said sheets over said writing table, means consisting of a movable portion of the writing table to draw said sheets backwardly over the writing table by engaging said sheets adjacent said crease.

3. In an autographic register having a plurality of sheets creased transversely at spaced intervals to define tickets, a writing table for supporting said sheets, a rearwardly moving section thereof over which said sheets pass, means of delivering said sheets at an angle to said section and the upper plane of said writing table and the section, and means for moving said movable section rearwardly adjacent the under side of said sheets and the crease therein to align said sheets on said crease.

4. In combination in an autographic register having a plurality of superimposed sheets defining a plurality of spaced transverse approximately superimposed creases on which said sheets are adapted to fold, a writing table, a rearwardly movable section thereof at the rear edge, an abutment spaced from the rear edge thereof forming a space therebetween, a cover carried by said abutment overlapping said reciprocating section, means of delivering said sheets to said section and said table, said cover being adapted to move said sheets to direct said sheets on to said section and said table parallel therewith, means to draw said sheets over said table until said superimposed creases are in line with but spaced from the reciprocating section of said table, means to release said sheet drawing means while said reciprocating section has moved said sheets backwardly, means to return said reciprocating section to its initial position, and means to cause said drawing means to reengage said sheets to move them to a point where the creases in said sheets engage the rear edge of said reciprocating table section.

5. In combination in an autographic register having a plurality of superimposed sheets defining a plurality of spaced transverse approximately superimposed creases on which said sheets are adapted to fold, a writing table, a rearwardly movable section thereof at the rear edge, an abutment spaced from the rear edge thereof forming a space therebetween, a cover carried by said abutment overlapping said reciprocating section, means of delivering said sheets to said section and said table, said cover being adapted to move said sheets to direct said sheets on to said section and said table parallel therewith, means to draw said sheets over said table until said superimposed creases are in line with but spaced from the reciprocating section of said table, means to release said sheet drawing means while said reciprocating section has moved said sheets backwardly, means to return said reciprocating section to its initial position, and means to cause said drawing means to re-engage said sheets to move them to a point where the creases in said sheets engage the rear edge of said reciprocating table section, and a tiltable abutment spaced from said section rearwardly when it is in its forward position.

6. In combination in an autographic register having a plurality of superimposed sheets defining a plurality of spaced transverse approximately superimposed creases on which said sheets are adapted to fold, a writing table, a rearwardly movable section thereof at the rear edge, an abutment spaced from the rear edge thereof forming a space therebetween, a cover carried by said abutment overlapping said reciprocating section, means of delivering said sheets to said section and said table, said cover being adapted to move said sheets to direct said sheets on to said section and said table parallel therewith, means to draw said sheets over said table until said superimposed creases are in line with but spaced from the reciprocating section of said table, means to release said sheet drawing means while said reciprocating section has moved said sheets backwardly, means to return said reciprocating section to its initial position, and means to cause said drawing means to re-engage said sheets to move them to a point where the creases in said sheets engage the rear edge of said reciprocating table section, a tiltable abutment spaced from said section rearwardly when it is in its forward position, and a cover plate covered by said tiltable abutment adapted to span the space between the abutment and said section and resting upon the rear edges of said sheets passing thereover.

7. In combination, a writing table, an under plate, a reciprocating table section carried thereby in alignment with the writing table, and means for actuating said under plate and said section.

8. In combination, a writing table, an under plate, a reciprocating table section carried thereby in alignment with the writing table, means for actuating said under plate and said section, and means of returning said under plate and section to their initial position after actuation.

9. In an autographic register, a writing table, an under plate, rearwardly disposed spaced arms forming a part of said table, said under plate projecting below said arms, a movable table section arranged between said arms carried by said under plate, and means to reciprocate said under plate and said section.

10. In an autographic register, a casing having a compartment for storing creased paper, a platen over which the paper passes and by which it is supported when being written upon, spaced elements for aligning the paper and controlling it on the platen, one of said elements having means to grip the paper and feed it, and the other of said elements having means to engage the creases of the paper to resist its forward movement, said last named means comprising a fixed part of the platen and a member moving in line with the platen.

11. In an autographic register, a casing having a compartment for storing paper, a platen over which the paper passes and by which it is supported when being written upon, spaced elements for aligning the paper and controlling it on the platen, one of said elements having means to grip the paper and the other element having a part movable independent of the platen and a stationary part, the movable part cooperating with the stationary part to align the paper.

12. In a register of the character described, the combination with a casing having a compartment for storing a record strip, a writing table over which said strip may be positioned for entry of a record thereon, a movable transverse strip positioning detent over which the strip passes when drawn forwardly to said writing table, said strip being weakened on transverse lines against bending resistance and engaging said detent at said weakened lines to increase the resistance to the strip feed so as to facilitate positioning of the strip upon said writing table, stops forming parts of the table limiting the movement of said detent, and spring means coacting with said detent to urge it into engagement with one of said stops.

13. In a register of the character described, the combination with a casing having a compartment for storing a record strip, a writing table over which said strip may be positioned for entry of a record thereon, a movable transverse strip positioning detent over which the strip passes when drawn forwardly to said writing table, said strip being weakened on transverse lines against bending resistance and engaging said detent at said weakened lines to increase the resistance to the strip feed so as to facilitate positioning of the strip upon said writing table, a pair of stops for said detent integral with the table, and spring means coacting with said detent to urge it into engagement with one of said stops.

14. In a device of the class described, the combination with a casing having a compartment for the storing of a record strip weakened on transverse lines against bending resistance, a writing table at the top of said casing, a slidable strip positioning detent disposed at the rear of said table and over which the strip is drawn in passing to the table, stops formed of parts of the table for limiting the movement of said detent, and a spring acting to normally urge said detent against one of said stops.

15. In a device of the class described, the combination with a casing having a compartment for the storing of a record strip weakened on transverse lines against bending resistance, a writing table at the top of said casing, a slidable strip positioning detent movable in the plane of the table disposed at one end of said table and over which the strip is drawn in positioning on the table, stops formed of parts of the table to limit the movement of the detent, and a pressure plate on one of the stops adapted to ride on the strip over said detent.

FRANK E. PFEIFFER.